March 24, 1970 TSUNEZO SHIMODA 3,502,013
PHOTOGRAPHIC CAMERA
Filed Aug. 23, 1967 2 Sheets-Sheet 2
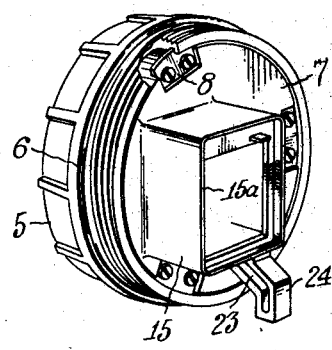
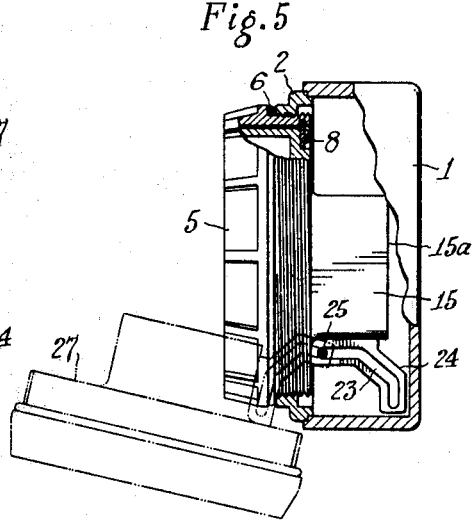
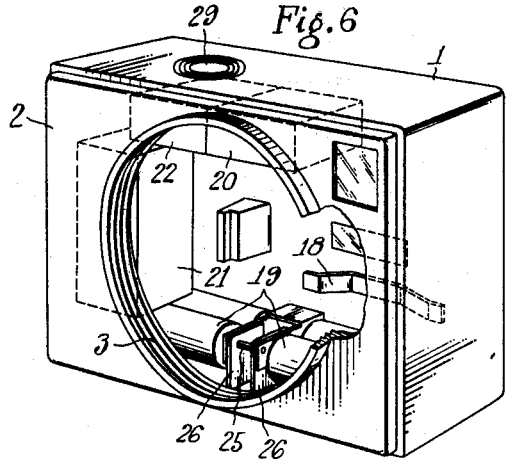
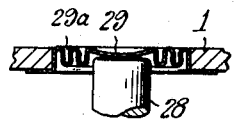
Tsunezo Shimoda
INVENTOR
BY Burgess, Ryan & Hicks
ATTORNEYS

United States Patent Office 3,502,013
Patented Mar. 24, 1970

3,502,013
PHOTOGRAPHIC CAMERA
Tsunezo Shimoda, Tokyo, Japan, assignor to Kabushiki Kaisha Ricoh, a corporation of Japan
Filed Aug. 23, 1967, Ser. No. 662,779
Claims priority, application Japan, Sept. 7, 1966, 41/58,684
Int. Cl. G03b 19/04
U.S. Cl. 95—31         6 Claims

ABSTRACT OF THE DISCLOSURE

A photographic camera has a single aperture located on its front wall. The aperture is large enough to permit the loading of a film magazine through it and is shaped to hold a lens assembly in a sealing relationship. The magazine is located, after loading, in the camera on the back wall and the lens assembly is secured to the front wall of the camera. A rear frame on the lens assembly cooperates with the film magazine to hold it in an operable position. A rotatable ring is operable to hold the lens assembly in sealing relationship with the camera body.

BACKGROUND OF THE INVENTION

In a camera of the type proposed in the present invention, the lens barrel mountable opening is arranged and constructed relatively larger than that of the conventional cameras so as to make it possible to incorporate a film magazine therethrough. On the back surface of a lens barrel which is adapted to be fixedly screwed into said lens barrel mount opening is provided a film magazine holding frame in which is tightly held the outer frame of an exposure window of a film magazine housing a film. Said film magazine holding frame is adapted to be movable in the direction of an optical axis without being rotated at the time the aforesaid lens barrel carrying the magazine holding frame is screwed into said lens barrel mountable opening.

SUMMARY OF THE INVENTION

In a camera according to the present invention, inasmuch as a film magazine is loadable from a lens barrel mountable opening, the back cover commonly provided with the conventional cameras, or the bottom cover employed in some of the cameras, can be dispensed with. Accordingly, the camera body can be made in the form of a completely sealed box except said lens barrel mountable opening which can be completely covered by tightly screwing the lens barrel thereinto.

The novel features that are considered characteristic of this invention are set forth with particularity in the appended claims. The invention itself, however, both as to its organization and its methods of operation, together with additional objects and advantages thereof, will best be understood from the following description of specific embodiments when read in connection with the accompanying drawings:

BRIEF DESCRIPTION OF THE DRAWINGS

FIG. 4 is a perspective view, as seen from the back, of a lens barrel mountable on the above photographic camera;

FIG. 5 is a side view of a connecting means for the lens barrel and the camera body;

FIG. 6 is a perspective view of a camera according to the present invention illustrating the body thereof only; and FIG. 7 is an enlarged sectional view taken along dot-and-dash lines VII—VII of FIG. 2.

Figure 1:
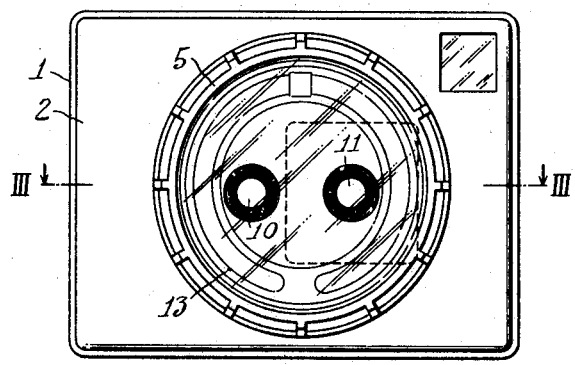
FIG. 1 is a front view of a photographic camera in accordance with a preferred embodiment of the present invention.
Figure 2:
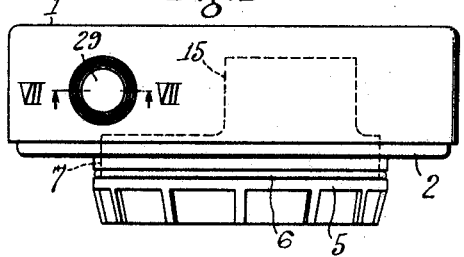
FIG. 2 is a plan view of the above embodiment.

1 represents a box-type body of a camera according to the present invention. Fixed securedly on said camera body 1 by means of adhesive or the like is a front plate 2 which is provided with a lens barrel mount opening having, at its inner circumference, a screw tap 3. On said lens barrel mountable opening is screwed the rear end portion of a ring 5 front surface of which is completely covered with a transparent plate 4, said ring 5 being adapted to be engageable with a lens barrel. Between the front edge of said lens barrel mountable opening and a stage portion 5a on the outer circumference of said ring 5 is held a seal ring 6 made of a plastic material.

The ring 5 is loosely fitted with a lens barrel unit 7 so as to be freely rotatable thereon, while a circular groove 5b cut in the inner circumference at the rear end portion of said ring 5 is loosely fitted with a finger tip 8 fixed on the outer circumference of the back of said lens barrel unit 7, whereby, relative movement of said ring 5 and said lens barrel unit 7 in the direction of optical axis is prevented.

On a supporting member 9 fixed at the front edge of said lens barrel unit 7 are secured a light receiving lens 10 and a photographic lens 11 side by side to each other. The supporting member 9 is further provided, proximate to its periphery, a circular groove 12 in which is incorporated a discharge tube 13 for flash light. A shutter S, which is positioned at the back of said photographic lens 11, is suitably fixed to the aforesaid lens barrel unit 7. Said shutter S employs an automatic exposure control means, in which either one of diaphragm opening control means and shutter speed control means, or both thereof, which are instantaneously interrelatable to each other, are adapted to be automatically operable in accordance with the amount of light received by an electrophotographic transducer 14 which is located at the rear site of the light receiving lens 10.

Figure 3:
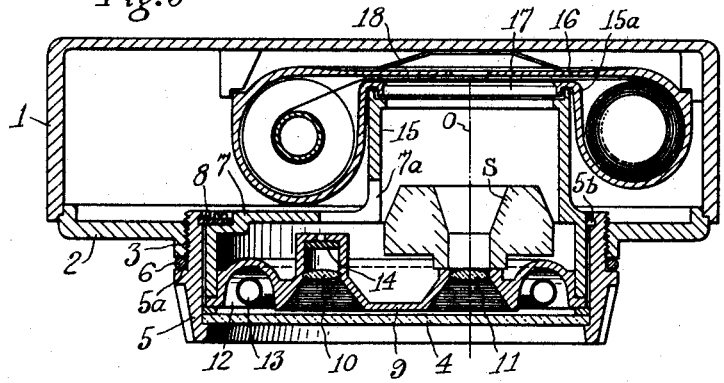
FIG. 3 is a sectional view taken along dot-and-dash lines III—III of FIG. 1.

At an eccentric position on the rear surface of the lens barrel unit 7 is unitarily formed an anugular-shaped film magazine holding frame 15 (FIGS. 4 and 5) encircling an optical path O, the rear edge 15a of which is struck with the periphery of an exposure window 17 (FIG. 3) of the film magazine 16, causing said film magazine 16 to be pressed against the force of a platen spring 18 provided on the camera body. The film magazine 16 is easily loadable in the camera body through the lens barrel mount opening by removing the lens barrel mounting and detaching ring 5.

Furthermore, the camera body 1 is so designed as to incorporate, as shown in FIG. 6, an electric source battery 19 for driving film winding mechanism and activating a flash lightening mechanism, as well as a film-wind driving mechanism 20 which is shown in block lines for convenience sake, a flash lightening mechanism 21 which is electrically connected with a discharging tube (refer FIG. 3), and other supplemental mechanisms.

Referring now to FIGS. 4 and 5, the bottom portion of a film magazine frame 15 is fixed with a connecting member 24 carrying a bent slot 23 which is loosely fitted with a pin 25. The pin 25 stems and extends horizontally from the upper portion of a pair of pillar plates 26. The connecting member 24 is adapted to prevent the lens barrel unit from rotating relative to the camera body as well as from being completely removed from the camera body when it is detached from the latter.

When the ring 5 for engaging and disengaging the lens barrel is drawn towards the front of the camera body after removal therefrom and rotated around pin 25, the lens barrel takes a position as shown in dot-dash lines in FIG. 5 so that the lens barrel mountable opening of the camera body 1 takes an opened position.

FIG. 7 shows a cross section of a shutter button portion in the camera body in which code 28 represents a shutter button provided in an indentation of the top cover of the camera body, while 29 indicates a cover plate carrying a wave-form ring 29a so as to be movable in a vertical direction. The periphery of the cover plate 29 is fixed to the camera body 1 by means of adhesive, for example, while the shutter button 28 is removably connected with the shutter mechanism provided in the lens barrel. Inasmuch as the shutter mechanism and the discharge tube are provided on the lens barrel which is designed in such a manner as to be unrotatable relative to the camera body, said shutter button 28 and the shutter mechanism as well as said discharge tube and the flash lightening device provided in the camera body can respectively be electrically connected with ease. A hole 7a provided on the back of the lens barrel 7 is useful for exposing a suitable mechanical element connecting the shutter mechanism and the shutter button 28 (refer FIG. 7) to the inside of the camera body. Inasmuch as the film is loadable through the lens barrel mount opening according to the present invention, a back cover which must be normally provided with the camera body of the conventional cameras can be obviated. This makes it possible to keep the interior of the camera body water-proof and light-proof, which is particularly effective in the manufacture of an all-weather camera.

It is intended that all matter contained in the above description or shown in the accompanying drawings shall be interpreted as illustrative and not in a limiting sense, since certain changes may be made in the above apparatus without departing from the scope of the invention herein involved. For example, as a means for connecting the camera body and the lens barrel mounting and detaching ring, bayonet mount can be adopted instead of the screw mount as shown in the drawings. Furthermore, the angular magazine pressure member provided at the rear surface of the lens barrel body as hereinabove described can be of any shape so long as the film magazine can be fixedly positioned relative to the camera body.

What is claimed is:

1. In a photographic apparatus, a box-like camera body comprising front and back walls, a lens assembly including a lens barrel mount, a film magazine assembly, a single aperture through said camera body on said front wall and large enough to permit the entrance of the film magazine assembly into said camera body for mounting adjacent said back wall and of such size and shape to receive said lens assembly in sealing relationship with said assemblies aligned upon a common photographic axis in operable position.

2. A photographic apparatus as set forth in claim 1 in which means on said lens assembly engages means on said film assembly to hold the latter means in operable position adjacent said back wall when said lens assembly is in sealing engagement with said camera body.

3. A photographic apparatus as set forth in claim 1 in which supporting means on said back wall receives and with the side of said lens assembly holds said film assembly when both said assemblies are in operable position in said body.

4. A photographic apparatus as set forth in claim 1, in which a rotatable ring on said lense assembly cooperates with said body to hold said lens assembly in sealing engagement with said body and in holding and pressing relationship to said film assembly to hold both assemblies in operable position in said body.

5. In a photographic apparatus as set forth in claim 1, in which said lense assembly has a rearwardly protruding frame adapted to hold said film assembly in operable position on the back wall inside said camera body when said assemblies are in assembled position.

6. In a photographic apparatus as set forth in claim 1, means on said lens assembly for locking said assemblies in operable position in said camera body.

References Cited

UNITED STATES PATENTS 2,948,204    8/1960    Kopp et al.
3,162,106    12/1964    d'Oplinter.

FOREIGN PATENTS 1,130,523    2/1957    France.

NORTON ANSHER, Primary Examiner

DAVID S. STALLARD, Assistant Examiner